(12) United States Patent
Chang

(10) Patent No.: US 11,064,764 B2
(45) Date of Patent: Jul. 20, 2021

(54) HIDDEN DRAINAGE SYSTEM FOR SHOES

(71) Applicant: VANBESTCO LTD., Taipei (TW)

(72) Inventor: Fu-Chuan Chang, Taipei (TW)

(73) Assignee: VANBESTCO LTD., Taipei (TW)

( * ) Notice: Subject to any disclaimer, the term of this patent is extended or adjusted under 35 U.S.C. 154(b) by 0 days.

(21) Appl. No.: 16/172,213

(22) Filed: Oct. 26, 2018

(65) Prior Publication Data

US 2020/0128910 A1 Apr. 30, 2020

(51) Int. Cl.
*A43B 5/08* (2006.01)
*A43B 7/08* (2006.01)
*A43B 13/14* (2006.01)
*A43B 5/00* (2006.01)
*A43B 13/22* (2006.01)
*B32B 25/04* (2006.01)
*B32B 3/30* (2006.01)
*A43B 13/04* (2006.01)

(52) U.S. Cl.
CPC .............. *A43B 13/141* (2013.01); *A43B 5/00* (2013.01); *A43B 5/08* (2013.01); *A43B 7/088* (2013.01); *A43B 13/22* (2013.01); *B32B 3/30* (2013.01); *B32B 25/042* (2013.01); *A43B 13/04* (2013.01); *B32B 2307/744* (2013.01); *B32B 2437/02* (2013.01)

(58) Field of Classification Search
CPC .. A43B 7/08; A43B 7/088; A43B 5/08; A43B 13/141; A43B 13/22; A43B 13/223; A43B 7/06; A43B 7/082

USPC ............................................................ 36/3 B
See application file for complete search history.

(56) References Cited

U.S. PATENT DOCUMENTS

| 4,078,321 A * | 3/1978 | Famolare, Jr. ............ | A43B 5/00 36/3 B |
| 4,617,745 A * | 10/1986 | Batra ...................... | A43B 7/146 36/28 |
| 4,888,887 A * | 12/1989 | Solow .................... | A43B 7/082 36/3 R |
| 4,939,851 A * | 7/1990 | Miller ...................... | A43B 5/08 36/3 B |
| 6,446,359 B2 * | 9/2002 | Tomat ...................... | A43B 7/08 36/28 |
| 8,015,729 B2 * | 9/2011 | Mizrahi Shapiro ...... | A43B 5/08 36/3 B |

(Continued)

*Primary Examiner* — Sharon M Prange
(74) *Attorney, Agent, or Firm* — Demian K. Jackson; Jackson IPG PLLC

(57) ABSTRACT

A hidden drainage system for shoes, configured on the outsole of a shoe, in which the two sides of the outsole are provided with a plurality of curved sections that are curved inward; the top of the outsole is provided with a plurality of transverse drainage troughs and several longitudinal drainage troughs; each of the transverse drainage troughs extends along the direction of the width of the outsole, and both ends are communicated with each of the curved sections, so that the two ends of each of the transverse drainage troughs will not be exposed on the side face of the outsole; the longitudinal drainage troughs extend along the length of the outsole and are communicated with each of the transverse drainage troughs; thus, water entering the shoe will flow into each of the transverse and longitudinal drainage troughs, and be discharged from each of the transverse drainage troughs.

9 Claims, 4 Drawing Sheets

(56) References Cited

U.S. PATENT DOCUMENTS

| | | | | |
|---|---|---|---|---|
| 2001/0025432 | A1* | 10/2001 | Contreras | A43B 7/08 36/3 R |
| 2010/0024253 | A1* | 2/2010 | Boyle | A43B 5/08 36/114 |
| 2013/0152430 | A1* | 6/2013 | Bier | A43B 7/088 36/3 A |
| 2016/0206037 | A1* | 7/2016 | McCormick | A43B 7/088 |

\* cited by examiner

HIDDEN DRAINAGE SYSTEM FOR SHOES

BACKGROUND OF INVENTION

1. Field of the Invention

The present invention relates generally to shoes, and more particularly to a hidden drainage system for shoes.

2. Description of Related Art

Generally, the structure of a conventional sport shoe includes such components as an outsole, an upper connected to the outsole, and an insole that is embedded inside the upper and positioned on the top of the outsole. Through the upper that covers the foot, and the outsole that provides buffering, slip resistance and wear resistance, the sport shoes are suitable for the wearer to carry out outdoor activities (e.g., climbing, trekking or wading) or sport, and can protect the wearer's feet. Of course, based on different structural designs, the sport shoes currently seen in the market are divided into many different types, such as basketball shoes, running shoes, hiking shoes, water shoes and leisure shoes, to meet the specific functional needs of various occasions.

For example, during outdoor activities such as trekking or wading, it is very likely that water will go into the sport shoes. In order to discharge the water entering the sport shoes, some manufacturers have developed sport shoes having a drainage function. Examples are amphibious shoes like water shoes or wading shoes. The drainage structure mainly features a plurality of drainage troughs configured on the outsole, with each of the drainage troughs communicated to the two sides of the outsole. Thus, when water enters the shoes, the water can be discharged from the two sides of the outsole through each of the drainage troughs, so as to prevent the wearer's feet from being soaked in water for a long time.

The structure of existing water-dischargeable shoes truly offers the function of drainage. However, the drainage outlets of the drainage troughs are exposed on the two side faces of the outsole. On one hand, it undermines the integrity of the shoe; on the other hand, the discharged water may be tossed out toward the front direction when the wearer lifts his/her foot. Moreover, the drainage outlets will likely be blocked by mud or sandstones, resulting in lowered drainage efficiency or even total loss of the drainage function.

SUMMARY OF THE INVENTION

The main object of the present invention is to provide a hidden drainage system for shoes, which can quickly discharge the water entering the shoes, and the drainage outlets are invisible from the side surfaces of the shoes. While offering better appearance than the existing water-dischargeable shoes, it can perfectly solve the problem of lowered drainage efficiency or lost drainage function of the existing water-dischargeable shoes due to blocking of the drainage outlets. Furthermore, during walking, when the wearer lifts his/her foot, the water will be discharged from the rear end of the shoe. This is different from the situation in the existing water-dischargeable shoes that the discharged water can be tossed out toward the front side when the wearer lifts his/her foot.

In order to realize said-mentioned object, the present invention provides a hidden drainage system for shoes, configured on the outsole of a shoe, having the following characteristics: the two sides of the outsole are provided with a plurality of curved sections that are curved inward; the top of the outsole is provided with a plurality of transverse drainage troughs and several longitudinal drainage troughs; each of the transverse drainage troughs extends along the direction of the width of the outsole, and both ends are communicated with each of the curved sections, so that the two ends of each of the transverse drainage troughs will not be exposed on the side face of the outsole; the longitudinal drainage troughs extend along the length of the outsole and are communicated with each of the transverse drainage troughs; thus, water entering the shoe will flow into each of the transverse and longitudinal drainage troughs, and be discharged from each of the transverse drainage troughs.

BRIEF DESCRIPTION OF THE SEVERAL VIEWS OF THE DRAWINGS

Below are detailed descriptions of the present invention based on a preferred embodiment and the accompanying drawings, wherein.

DETAILED DESCRIPTION OF THE INVENTION

Figure 1:
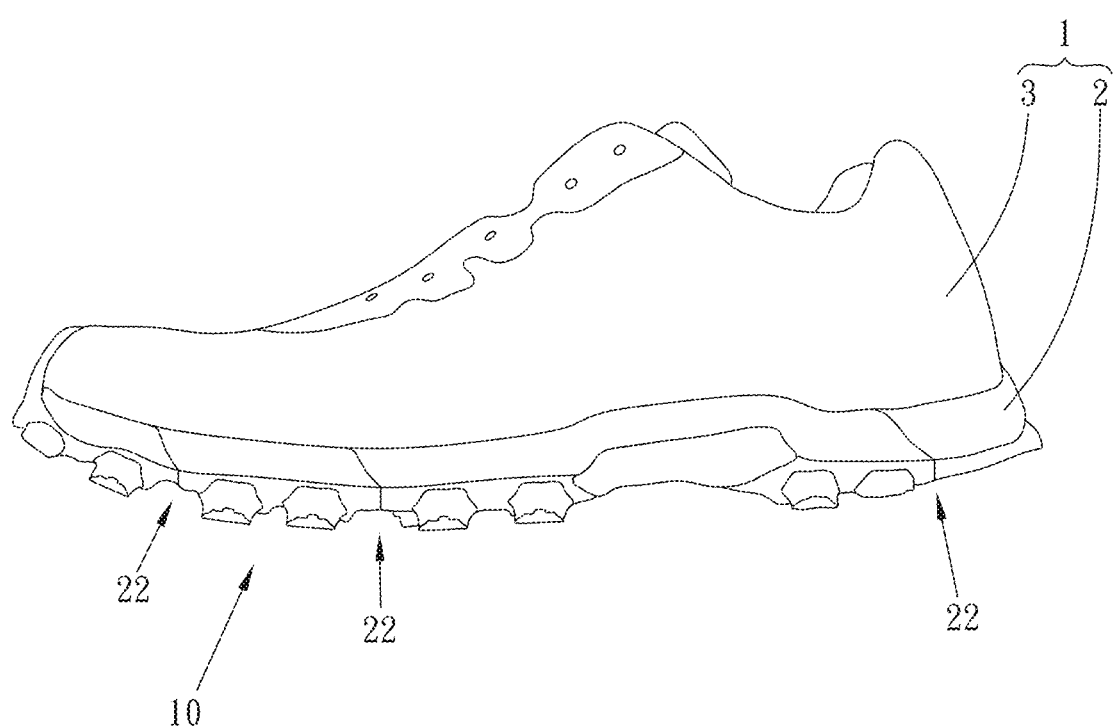
FIG. 1 is a side view of a preferred embodiment of the present invention.
Figure 2:
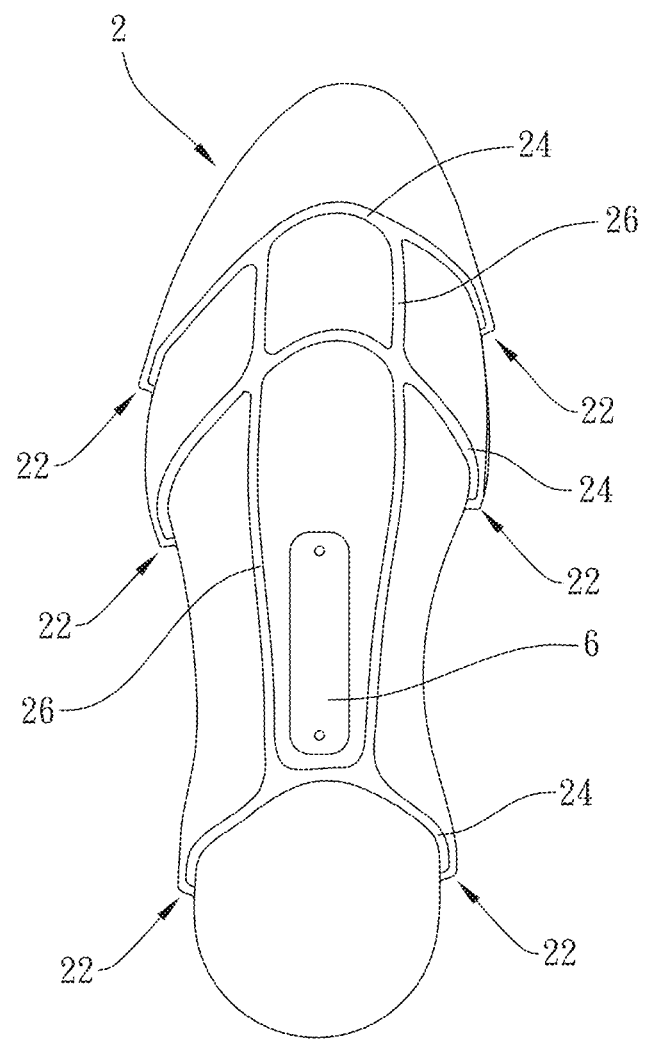
FIG. 2 is a top view of the outsole of a preferred embodiment of the present invention.
Figure 3:
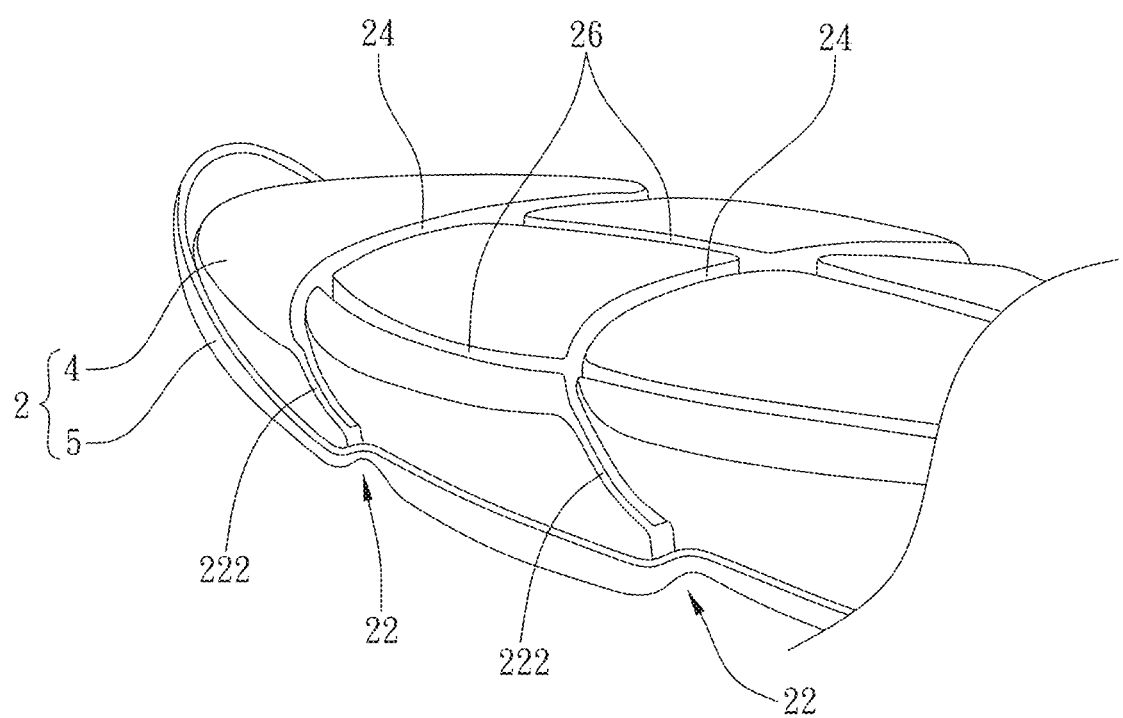
FIG. 3 is a partial perspective view of the outsole of a preferred embodiment of the present invention.
Figure 4:
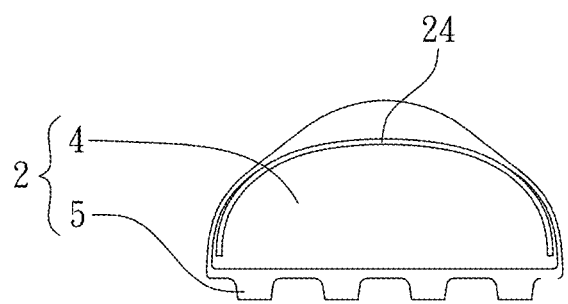
FIG. 4 is a sectional view of a preferred embodiment of the present invention along the direction of the transverse drainage trough.

Firstly, referring to FIG. 1 to FIG. 4, the hidden drainage system for shoes 10 of a preferred embodiment of the present invention is configured on the outsole 2 of a shoe 1. Said shoes 1 can be existing sport shoes or amphibious shoes like water shoes or wading shoes that are made up of the components of an outsole 2 and an upper 3 (not detailed here). The characteristics of the hidden drainage system for shoes 10 are as below:

The two sides of the outsole 2 are provided with a plurality of curved sections 22, and each of the curved sections 22 are configured with a tilted surface 222 facing toward the rear end of the outsole 2. Moreover, the top of the outsole 2 is provided with a plurality of transverse drainage troughs 24 and two longitudinal drainage troughs 26 in a concave way. Each of the transverse drainage troughs 24 is in the shape of an arc protruding toward the front direction of the outsole 2. They extend along the direction of the width of the outsole 14 roughly in a parallel arrangement, and their two ends extend to the tilted surface 222 of each of the curved section 22, so that the two ends of each of the transverse drainage trough 24 will not be exposed on the sides of the outsole 2. Furthermore, the central portion of the outsole 2 (in the direction of its length) is higher than the two sides, so that the central section of each of the transverse drainage troughs 24 is higher than the two end sections. The two longitudinal drainage troughs 26 extend relatively along the direction of the length of the outsole 2 and are communicated with each of the transverse drainage troughs 24.

The outsole 2 is made by laminating an elastic layer 4 and an anti-slip layer 5. The elastic layer 4 is made of materials like EVA, and the anti-slip layer 5 is made of materials like rubber, with its hardness higher than the elastic layer 4 (for example, the hardness of the elastic layer 4 can be 55-60 degrees, and the hardness of the anti-slip layer 5 can be 60-65 degrees), and having appropriate wear and slip resistance. The transverse drainage troughs 24 and longitudinal drainage troughs 26 are configured on the elastic layer 4 in a concave way, and the tilted surface 222 of each of the curved section 22 is also configured on the elastic layer 4. Furthermore, the top of the elastic layer 4 is configured with a supporting piece 6, being a nylon supporting piece with its hardness higher than the elastic layer 3 (for example, its hardness can be 85 degrees), and positioned between the two longitudinal drainage troughs 26, to support the arc.

Based on said structure, the curved sections 22 can allow the side of the outsole 2 to have a streamline appearance like shark gill, and the transverse drainage troughs 24 extending to the curved sections 22 will not be seen from the side of the shoe 1.

Figure 5:
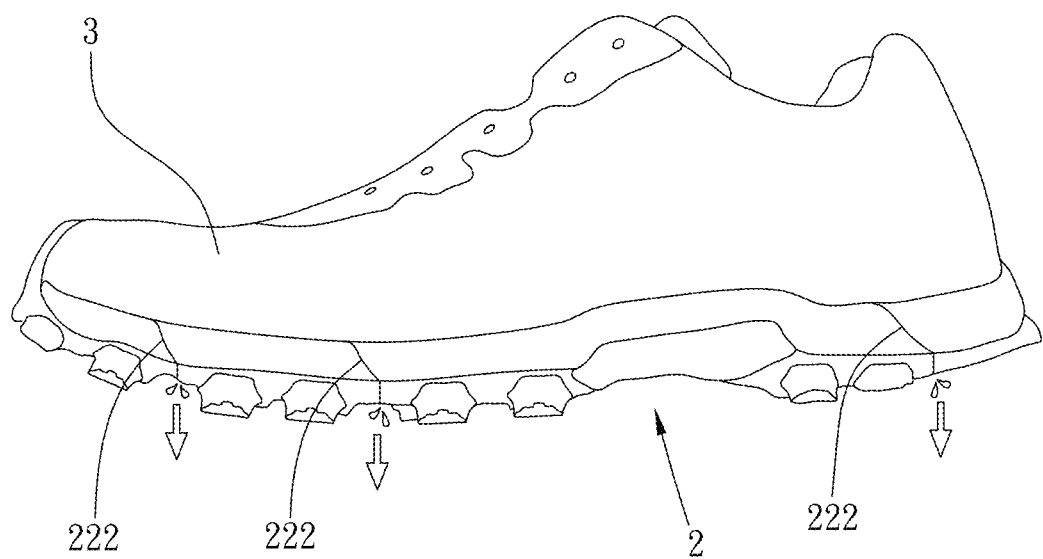
FIG. 5 is a drainage status view of the outsole of a preferred embodiment of the present invention.

With the constitution of each of the components, the hidden drainage system for shoes 10 disclosed in the present invention has the following features and efficacies:

Referring to FIG. 5, when water enters the shoe 1, the water will flow to the outsole 2, through communication of each of the longitudinal drainage troughs 26, and via each of the transverse drainage troughs 24, the water will be discharged from each of the tilted surfaces 222.

In particular, based on the structures of an arc-shaped extension path of each of the transverse drainage troughs 24 protruding toward the front of the shoe 1, the height difference between the central section and the two end sections of each of the transverse drainage troughs 24, as the two ends of each of the transverse drainage troughs 24 extending to each of the tilted surfaces 222, when the wearer of the shoe 1 lifts his/her foot during walking, the water will be quickly discharged from the rear end of the shoe 1, avoiding the problem of the existing water-dischargeable shoes that the water discharged from drainage outlets exposed on the two sides will be tossed out toward the front end.

Furthermore, the two ends of each of the transverse drainage troughs 24 are extending to the curved sections 22. From the side of the shoe 1, the two ends of each of the transverse drainage troughs 24 can not be directly seen. Moreover, the two ends of each of the transverse drainage troughs 24 are in the form of an inclined trough, instead of exposed drainage outlets as in the existing water-dischargeable shoes. Therefore, the present invention not only maintains an integral appearance of the shoe 1 to improve the incompletion of appearance caused by the exposed water drainage outlets in the existing water-dischargeable shoes, but also solves the problem of lowered drainage efficiency or total loss of drainage function when the drainage outlets are blocked by mud or sandstones.

Of course, the top of each of the curved sections in the present invention is not limited to the form of a tilted surface, it can also be perpendicular to the ground, or a slant of any angle. The requirement of the present invention is met as long as it can hide the two ends of each of the transverse drainage troughs.

To summarize, based on the unique structure of the present invention of a hidden drainage system for shoes, characterized by each of the transverse drainage troughs and longitudinal drainage troughs on the outsole, and each of the curved sections on the two sides of the outsole, when water goes into the shoes, the water can be quickly discharged from the tilted surface of each of the curved sections. Moreover, as each of the transverse drainage troughs has an arch-shaped extension path protruding toward the front of the shoe, and there is a height difference between the central section and the end sections of the transverse drainage trough, when the wearer lifts his/her foot during walking, the water will be discharged from the rear end of the shoe. This is different from the situation in the existing water-dischargeable shoes that the discharged water will be tossed out toward the front end. Furthermore, the two ends of each of the transverse drainage troughs extend to each of the tilted surfaces, offering a better appearance of integrity than the existing water-dischargeable shoes. It can also solve the problem of the existing water-dischargeable shoes that the exposed drainage outlets may be blocked, causing lowered drainage efficiency or total loss of the drainage function. Therefore, the present invention meets the prerequisites for a patent, and a patent application is submitted.

What is claimed is:

1. A hidden drainage system for shoes, configured on an outsole of a shoe, having the following characteristics:
two sides of an instep portion of the outsole are provided with a plurality of curved sections that are curved toward a heel portion of the outsole; a top of the outsole is provided with a plurality of transverse drainage troughs and one or more longitudinal drainage troughs; each of the transverse drainage troughs extends along a direction of a width of the instep portion of the outsole, and both ends of each transverse drainage trough are communicated with a respective curved section, so that the two ends of each of the transverse drainage troughs are not exposed on a side face of the outsole and are exposed on a top face of the plurality of curved sections, thereby hiding the two ends of each transverse drainage trough, and the extending path of the transverse drainage troughs is in the shape of an arc extending in a forward direction and each of the curved sections is configured with a tilted surface directed to the heel portion of the outsole and the two ends of each transverse drainage trough extend to each tilted surface; the longitudinal drainage troughs extend along the length of the outsole and are communicated with each of the transverse drainage troughs; thus, water entering the shoe will flow into each of the transverse and longitudinal drainage troughs, and be discharged from each of the transverse drainage troughs.

2. The structure system in claim 1, wherein the arc-shaped extending path of the transverse drainage troughs protrudes toward the front end of the outsole, and the two ends of each of the transverse drainage troughs corresponds to the direction of the rear end of the outsole.

3. The structure system in claim 1, wherein the top of the outsole is further configured with a supporting piece.

4. The structure system in claim 3, wherein the top of the outsole is configured with two longitudinal drainage troughs and the supporting piece is positioned between the two longitudinal drainage troughs.

5. The structure system in claim 4, wherein said outsole comprises an elastic layer and an anti-slip layer, said elastic layer being laminated on the anti-slip layer, and each of the transverse and longitudinal drainage troughs and the supporting piece being configured on the elastic layer.

6. The structure system in claim 5, wherein the tilted surface of each curved section is configured on the elastic layer.

7. The structure system of claim 3, wherein the outsole comprises an elastic layer and an anti-slip layer, the elastic layer is laminated on the anti-slip layer, and each of the transverse and longitudinal drainage troughs and the supporting piece is configured on the elastic layer.

8. The structure system in claim 1, wherein said outsole comprises an elastic layer and an anti-slip layer, said elastic layer being laminated on the anti-slip layer, and each of the transverse and longitudinal drainage troughs are configured on the elastic layer.

9. The structure system in claim 8, wherein the tilted surface of each curved section is configured on the elastic layer.

\* \* \* \* \*